July 19, 1932.   W. PAULUS   1,868,250
HORN CONSTRUCTION
Filed May 13, 1931
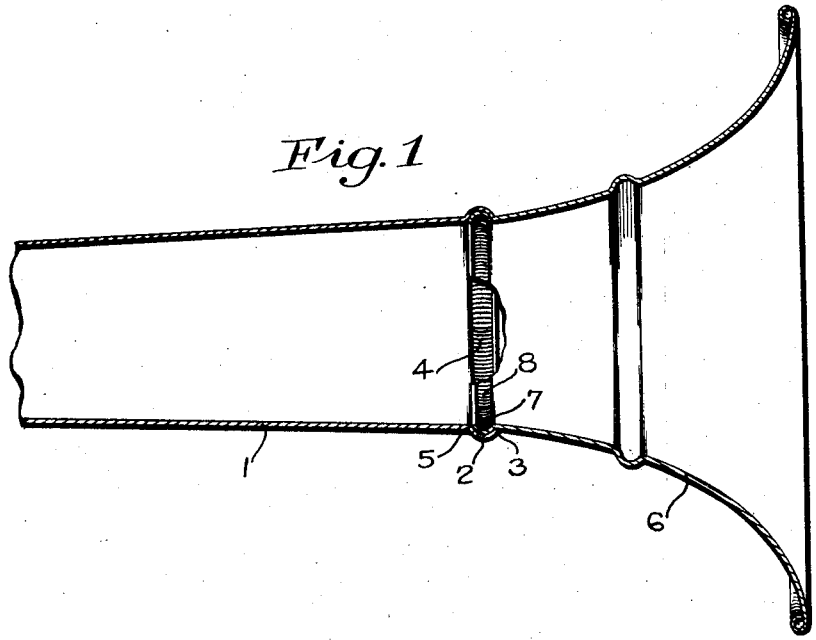
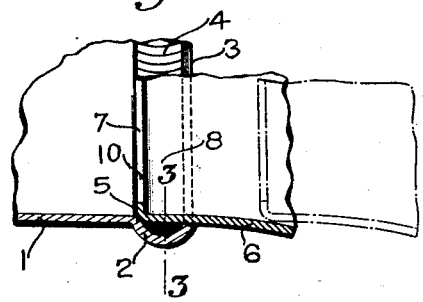
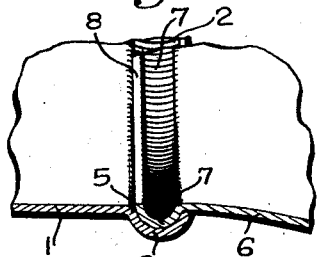
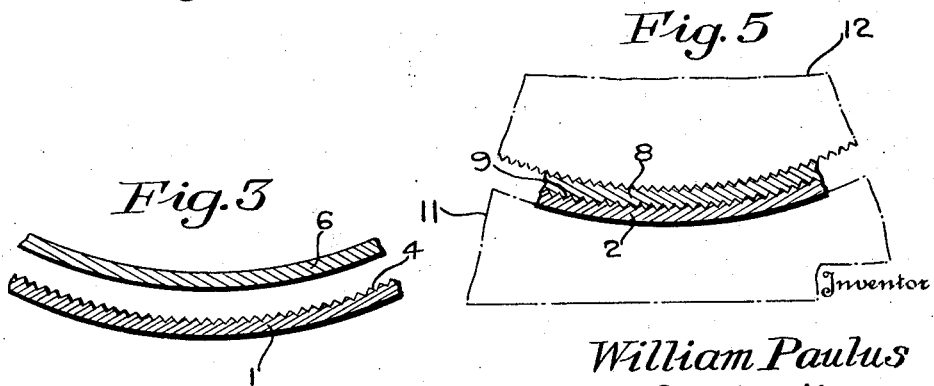
Inventor
William Paulus
By Bean, Brooks & Henry.
Attorney Patented July 19, 1932

1,868,250

UNITED STATES PATENT OFFICE

WILLIAM PAULUS, OF BUFFALO, NEW YORK, ASSIGNOR TO TRICO PRODUCTS CORPORATION, OF BUFFALO, NEW YORK

HORN CONSTRUCTION

Application filed May 13, 1931. Serial No. 537,168.

This invention relates to the art of manufacturing horns, and it has particular reference to a method by means of which a separate horn bell is securely and firmly attached to a horn body, and horns produced by the method.

Heretofore, horn bells have generally been attached to horn bodies by soldering and similar methods, but these methods have been relatively expensive to use. Certain disadvantages have become apparent in the horns produced by these methods especially when mounted on motor vehicles. For example, vibration and road shocks have been transmitted to the horns when so mounted so that in time the bells have tended to become loose, and in cases have been lost.

In the present invention the manufacturing costs are materially reduced and the horns produced by this method have the horn bells so attached to the horn bodies that they successfully resist vibration and road shocks.

One specific embodiment of the principles of the invention is illustrated in the drawing, wherein:

Fig. 1 is a fragmentary sectional view of a horn body with a horn bell permanently attached to the outer end thereof.

Fig. 2 is a fragmentary sectional view on an enlarged scale showing the lapped relation of the horn bell to the horn body, when the former is inserted in the latter. The broken lines depict a position of the horn bell during insertion.

Fig. 3 is a transverse sectional view taken along line 3—3 of Fig. 2 showing the relation of the horn bell to the horn body when the former is inserted in the latter.

Fig. 4 is a fragmentary sectional view on an enlarged scale showing the relation of the horn bell to the horn body when the parts are fully assembled, and, Fig. 5 is a transverse sectional view taken centrally of Fig. 4 showing the interengagement of the horn parts.

As shown in Fig. 1 the tapered section or horn body 1 is formed with a peripheral bead 2 on the larger end 3 of body 1. The inner surface of the bead 2 is knurled or transversely serrated as at 4. A shoulder 5 is formed on the horn body immediately adjacent and as a part of the bead 2 during the beading operation and is of less diameter than the outer end of said bead for a purpose to be hereinafter described.

A bell section or horn bell 6 of any suitable shape is mounted in the horn body by means of a peripheral bead 7 that is complementary to the peripheral bead 2 and is formed on the smaller end 8 of said bell. Said bead is knurled or serrated as at 9 so that the outer surface of bead 7 interengages with the inner surface 4 of bead 2 and a positive firmer joint between the horn body and horn bell results.

The horn body 1 is formed from a tube in a well known manner. The diameter of the opposite ends and the length of the body may be varied to obtain the tonal quality desired. The bead 2, serrations 4 and shoulder 5 may be formed during the forming of the horn body or in a separate operation as desired.

The horn bell 6 is formed in any suitable shape as by spinning or stamping operations and an inturned peripheral flange 10 may be formed in the same or a separate operation.

The horn body and horn bell having been formed as above described the next step is to insert the end 8 of bell 6 into the end 3 of body 1 and by referring to Fig. 2, it will be seen that the insertion of the end 8 into end 3 is limited by the flange 10 which abuts the shoulder 5, determining the lapped relation of the bell with respect to the body. The material of the flange 10 not only provides a stop to limit the insertion of the bell into the body, but also provides the necessary material for expansion when the bead 7 is formed without disturbing the relation of the bell with respect to the horn, as well as serving as an abutment or guide for the expanding tool prior to the forming of bead 7. The lapped relation of the horn body and horn bell may be maintained by placing the body 1 in a holding die 11, (partially shown in broken lines in Fig. 5), for giving the bead 2 external support, and then inserting an expanding tool or die 12, (partially shown in broken lines in Fig. 5), within the bell and expanding it to force the lapped portion of the bell which is immediately adjacent the flange 10 into intimate contact with the inner surface 4 of the bead 2. Thus, the complementary bead 7 is formed on the bell and the intimate contact between the beads is obtained. To insure this intimate contact between the beads the operative face 14 of the expanding die 12 may be knurled or serrated in a manner similar to that of the surface 4 whereby a transverse section through the beads simulates that shown in Fig. 5.

From a perusal of the foregoing description it will be apparent that a horn and method of making the same has been provided to efficiently produce two-part horns having a permanent joint that will withstand vibration and road shocks.

What is claimed is:

1. A horn comprising a horn body having a bead on one end thereof, a horn bell having a complementary bead, one of said beads being mounted in the other of said beads, and interengaging means on each of said beads to prevent relative movement of the beads.

2. A horn comprising a horn body formed with an annular bead on one end thereof, a horn bell having a complementary bead, one of said beads being mounted in the other of said beads, and means on the inner surface of the outer bead inter-engaging complementary means on the outer surface of the inner bead to prevent relative movement of the beads.

3. A horn comprising a horn body formed with an annular bead on one end thereof, the inner surface of said bead being formed with transverse serrations, and a horn bell having a complementary bead, the outer surface of said complementary bead being provided with transverse serrations which interengage the serrations of the horn body bead to prevent relative movement of the beads.

WILLIAM PAULUS.